Figure 2:
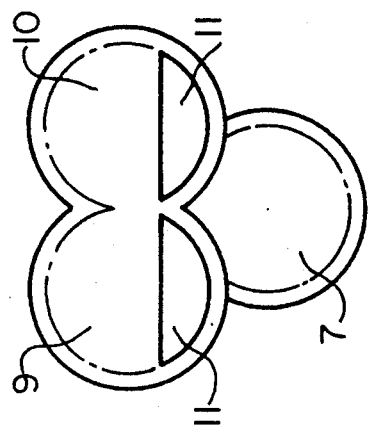

United States Patent [19]

Méry

[11] Patent Number: 5,212,996
[45] Date of Patent: May 25, 1993

[54] CRANK DRIVE WITH PLANETARY PIVOT PIN, FAVOURABLY FOR PISTON POWER ENGINES AND MACHINE TOOLS

[75] Inventor: Dezsö Méry, Budapest, Hungary

[73] Assignee: Laszlo Berinkey and Josef Szecsanszky, Budapest, Hungary

[21] Appl. No.: 650,640

[22] Filed: Feb. 5, 1991

[30] Foreign Application Priority Data

Feb. 6, 1990 [HU] Hungary .................. 678/90

[51] Int. Cl.⁵ .......................... F16H 21/18
[52] U.S. Cl. ........................ 74/49; 74/603; 74/162
[58] Field of Search ............ 74/49, 595, 603; 475/162

[56] References Cited

U.S. PATENT DOCUMENTS

| | | | |
|---|---|---|---|
| 2,458,869 | 1/1949 | Naylor | 74/49 X |
| 3,279,391 | 10/1966 | Masciopinto | 74/49 |
| 4,270,395 | 6/1981 | Grundy | 74/49 |
| 5,004,404 | 4/1991 | Pierrat | 74/603 X |
| 5,011,385 | 4/1991 | Eiermann | 475/162 X |

FOREIGN PATENT DOCUMENTS 916809 8/1954 Fed. Rep. of Germany .......... 74/49
487984 12/1953 Italy ............................. 74/49

Primary Examiner—Rodney H. Bonck
Assistant Examiner—Daniel Wittels
Attorney, Agent, or Firm—Mason, Fenwick & Lawrence

[57] ABSTRACT

The drive shaft drive mechanism of the invention converts straight-line motion into rotary motion, or rotary motion into straight-line motion. The mechanism is provided with a pivot-pin connected to one or more pistons, an internally-toothed ring gear, a planet gear in contact with the ring gear, and an eccentric disk driven by the planet gear, such that the pivot-pin connected to the pistons have a straight-line motion, and the conversion of the direction of the motion is achieved without the insertion of a crank shaft.

5 Claims, 3 Drawing Sheets

CRANK DRIVE WITH PLANETARY PIVOT PIN, FAVOURABLY FOR PISTON POWER ENGINES AND MACHINE TOOLS

The object of the present invention is a mechanism for converting straight-line, reciprocating motion to rotary motion or vice versa directly without inserting a crank shaft or link element.

In the present state of the art in internal combustion engines an auxiliary element, which most often is a crank shaft and more rarely is a link system, is used between the piston and the drive shaft for converting the characteristic motion.

As a consequence of inserting a crank shaft, the height of the engine housing is increased; the mass forces can only be balanced in part; the component force on the crank shaft is perpendicular to the piston and abrades both the side wall of the cylinder and the piston, resulting in significant losses from friction; because of the bore-per-stroke ratio there is only a certain possibility of divergence until the limit is reached; the manufacture of the crank shaft is difficult and expensive and requires special machine fittings to produce it.

In the link system the frictional power losses between the link drivers and the guide reduce the effective power of engine to a significant degree.

The aims of the present invention are to eliminate drawbacks of the known crank shaft drive mechanisms and to develop a mechanism that will provide conversion of straight-line, reciprocating motion to rotary motion without inserting a crank shaft or link.

The present invention is based on the recognition that, if a suitably modified planet gear is caused to roll within an internally toothed gear, the connecting rod and the piston could be fixed to a given point of the planet gear.

Figure 3:
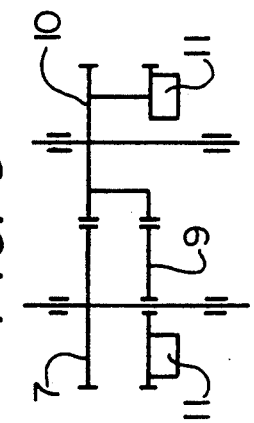
Figure 1:
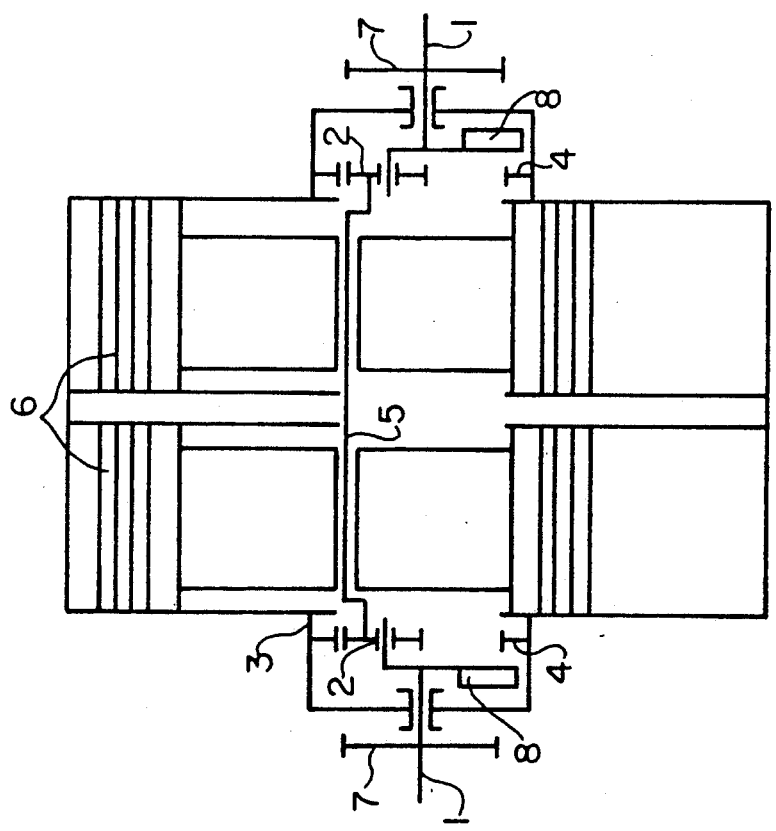
Figure 4:
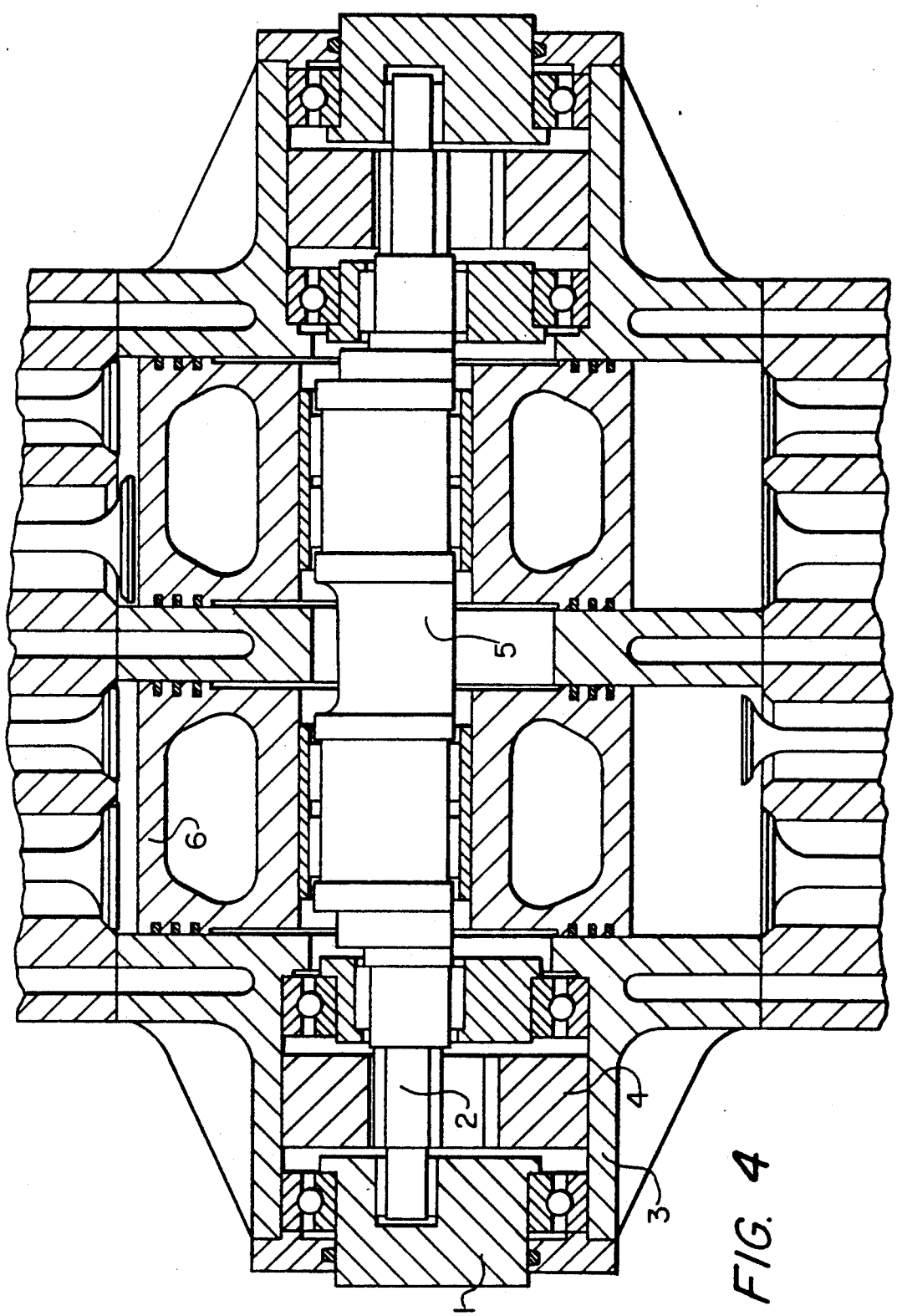
Figure 5:
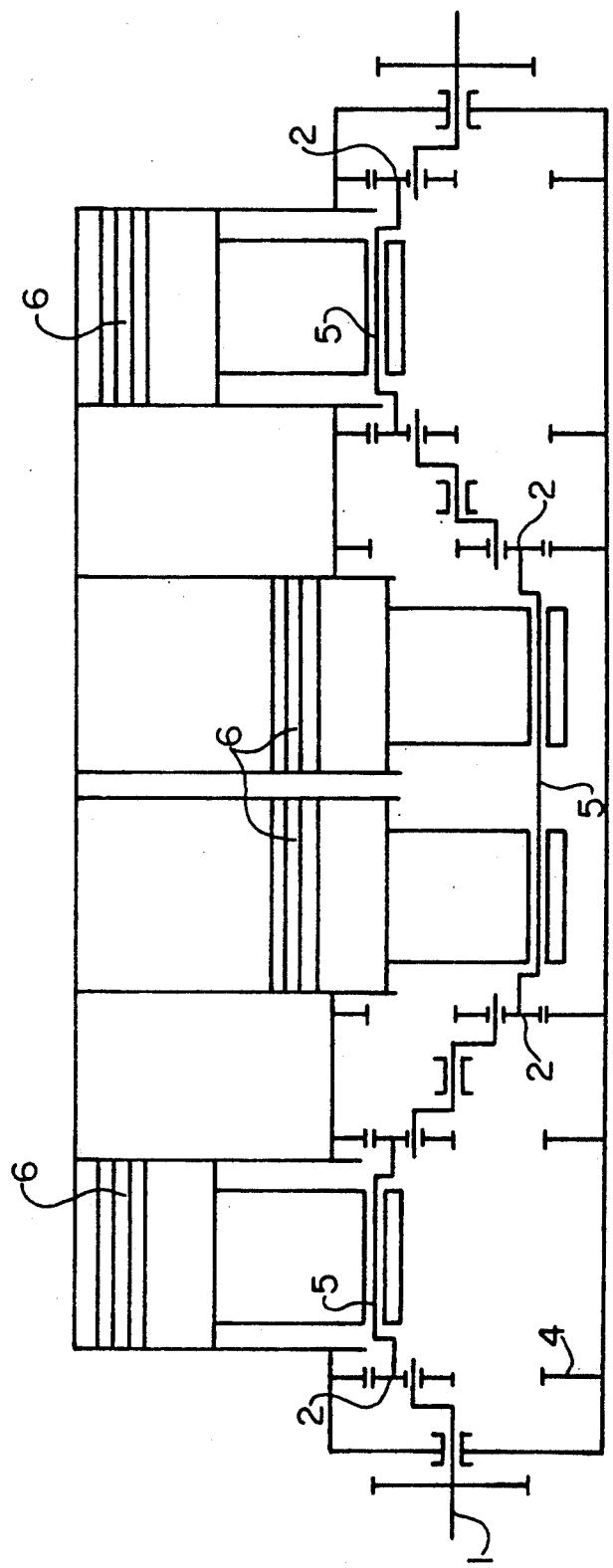

The present invention with respect to an engine will now be explained and described with reference to the accompanying drawing, in which FIG. 1 is a schematic longitudinal section of the crank shaft drive mechanism according to the present invention, FIG. 2 is a front schematic view showing the principle of massforce balancing in the mechanism according to the present invention, FIG. 3 is a top schematic view showing the principle of massforce balancing in the mechanism according to the present invention, FIG. 4 shows a more specific structure of the mechanism according to FIG. 1, and FIG. 5 is a schematic longitudinal section of an alternate form of the crank shaft drive mechanism.

Each of the embodiments shown in FIGS. 1-4, by way of example, consists of an internally-toothed ring gear, a pivot-pin forming a single element with a planet gear, a piston, and a spur gear driving counterweights.

The planet gears 2 which bear the eccentric disks 1 form a common unit with the pivot-pin 5. The planet gears 2 are connected to the internally-toothed gears 4 which are securely fixed in the engine block 3. The rates of the number of teeth of the ring gears 4 and the planet gears 2 is 2:1. The distance between the center-line of pivot-pin 5 and the center line of planet gear 2 is equal to the radius of the rolling circle of the planet gear. The pistons 6 are directly connected to the pivot-pin 5 through bearings. Both ends of pistons 6 are closed and two combustion chambers are formed in the cylinder bore. The gears 7 fixed to eccentric disks 1 are connected to gears 10 connected to the gears 9. The number of teeth in gears 7, 9, and 10 and parameters of gears 7, 9, and 10 are identical. The counterweights 11 are arranged on the gears 9 and 10 at an angle of 180° with respect to the pivot-pin 5. The counterweights 8 are arranged on the eccentric disks 1.

During operation of the mechanism the piston performs a reciprocating motion resulting in the motion of pivot-pins fixed thereto. Due to the connection between the crank drive and the pivot-pin in accordance with the invention, the pivot-pin 5 is in rotary motion around its axis; at the same time, it travels in a straight-line together with the piston while, the planet gears 2 rolling inside the ring gears 4 perform a rotary motion around the center-line of the eccentric disk 1. The counterweights 11 are in counter-movement together. The components of the centrifugal forces acting on the counterweights perpendicular to the direction of the piston motion are in balance, and their components in the direction of piston motion are equal in direction and magnitude to the mass-forces of the pistons, but in opposite sense, so the reciprocating mass-forces are fully balanced. The mass force resulting from the rotary motion of planet gears 2 is balanced out by counterweights 8.

The drive shaft mechanism constructed according to the present invention has a number of advantages in comparison to the known solutions.

The height and width of the engine housing are significantly reduced while the number of combustion chambers and the piston displacement remain the same.

A crank shaft is not required.

The pivot-pin and the eccentric disks, which can simply be made of rolled-steel, provide the motion conversion instead of a crankshaft which is difficult and expensive to produce.

The bore-per-stroke ratio can be reduced to a significantly greater degree in comparison to the known solutions, allowing the use of a piston with a greater diameter and a shorter stroke to achieve the same piston displacement. The piston with greater diameter allows the use of an intake valve with a greater diameter, increasing the power of the engine, because the power of the engine changes proportionately with the square of intake valve diameter.

The mass-forces are fully balanced.

There is no component force perpendicular to the longitudinal axis of the piston, so the abrasion of the piston and the cylinder and the friction loss are significantly lower, improving their life cycle.

The production costs of a drive mechanism according to the present invention are significantly lower in comparison to the known solutions.

The present invention is crank drive converting straight-line, alternating motion to rotary or vice versa, with one or more pivot-pins (5), planet wheels (2), internal gears (4) and eccentric disks (1) arranged in piston(s) (6) is such a way, the pivot-pin (5) arranged in piston (6) being i a straight-line motion allows the conversion of motion without inserting crank rod. Characterized are FIGS. 1-4.

I claim:

1. A drive shaft drive mechanism for an internal combustion engine including an engine block having cylinder bores therein and pistons reciprocable in the cylinder bores said drive shaft mechanism being fitted on the pistons and comprising:

a pivot-point attached to the pistons, said pivot-point having a longitudinal axis, a ring gear having internal teeth and being firmly fastened to the engine block;

a planet gear formed as a unit with said pivot-pin and having external teeth which intermesh with said internal teeth of said ring gear, said planet gear having an axis of rotation parallel to said longitudinal axis of said pivot-pin, the distance between said longitudinal axis of said pivot-point and said axis of rotation of said planet gear being equal to the rolling radius of said planet gear, and the ratio between the number of said internal teeth of said ring gear and said external teeth of said planet gear being 2:1; and an eccentric disk firmly attached to said planet gear.

2. The mechanism of claim 1, wherein both ends of each piston are closed and two combustion chambers are formed in each cylinder bore.

3. The mechanism of claim 1, wherein each piston is provided with one combustion chamber, and the pistons are arranged one after another in a row.

4. The mechanism of claim 1, further comprising:
a first gear fastened to said eccentric disk;
a second, driven gear in mesh with said first gear;
a third, driven gear in mesh with said second, driven gear; and
first and second counterweights arranged respectively on said second and third, driven gears at an angle of 180° relative to said pivot-pin; and
a third counterweight fastened to said eccentric disk at an angle of 180° relative to said planet gear.

5. The mechanism of claim 1, wherien the longitudinal axes of the cylinder bores are arranged at an arbitrarily chosen angle relative to each other.

* * * * *